(12) United States Patent  
Vernica

(10) Patent No.: US 7,780,461 B1
(45) Date of Patent: Aug. 24, 2010

(54) MIDPOINT CABLE ELECTRICAL GROUND CLAMP

(76) Inventor: Mike Vernica, 11554 E. Rincon Dr., Whittier, CA (US) 90606

( * ) Notice: Subject to any disclaimer, the term of this patent is extended or adjusted under 35 U.S.C. 154(b) by 0 days.

(21) Appl. No.: 12/397,161

(22) Filed: Mar. 3, 2009

(51) Int. Cl.
*H01R 4/66* (2006.01)
(52) U.S. Cl. ..................................... 439/100
(58) Field of Classification Search .......... 439/98–101, 439/804, 810, 814
See application file for complete search history.

(56) References Cited

U.S. PATENT DOCUMENTS

| | | | |
|---|---|---|---|
| 1,899,309 A | 2/1933 | Buchanan | |
| 2,077,613 A | 4/1937 | Bondeson | |
| 2,116,776 A * | 5/1938 | Bondeson | 439/804 |
| 2,533,897 A * | 12/1950 | Reddock | 439/804 |
| 3,058,087 A * | 10/1962 | Piasecki | 439/100 |
| 3,549,787 A | 12/1970 | Chura, Jr. | |
| 3,568,128 A | 3/1971 | Taylor | |
| 3,639,677 A | 2/1972 | Bain | |
| 3,901,577 A | 8/1975 | Philibert et al. | |
| 4,613,191 A | 9/1986 | Papa | |
| 4,776,808 A | 10/1988 | Davidson | |
| 4,820,901 A | 4/1989 | Peviani | |
| 4,925,395 A | 5/1990 | Franks, Jr. | |
| 5,306,170 A | 4/1994 | Luu | |
| 5,364,281 A | 11/1994 | Leto | |
| 5,460,532 A | 10/1995 | Leto | |
| 6,976,857 B1 * | 12/2005 | Shukla et al. | 439/100 |

* cited by examiner

*Primary Examiner*—Chandrika Prasad
(74) *Attorney, Agent, or Firm*—Kenneth L. Green

(57) ABSTRACT

A ground fitting allows simplified electrical connection between a ground wire carried in a metal sheathing, and a ground point such as a water pipe or ground rod. The metal sheathing is cut and separated and a short length of ground wire is exposed. The ground wire is inserted laterally into a wire clamp portion of the ground fitting, and opposing ends of the metal sheathing carrying the ground wire are inserted longitudinally under clamping plates on opposite sides of the ground fitting. A ground screw is tightened against the ground wire to hold the ground wire in the ground fitting and plate screws securing the clamping plates are tightened to secure the sheathing between the clamping plates and clamp seats. Ridges may be provided on one or both of the clamping plates and the clamp seat to engage a spiral exterior surface of the metal sheathing.

12 Claims, 3 Drawing Sheets

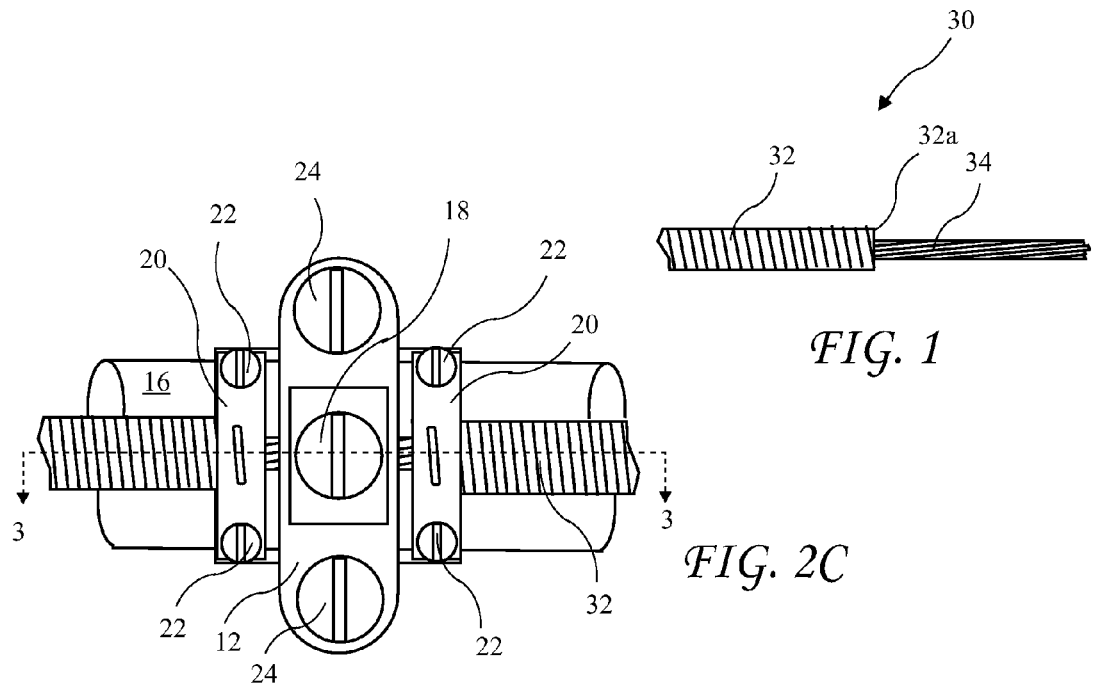
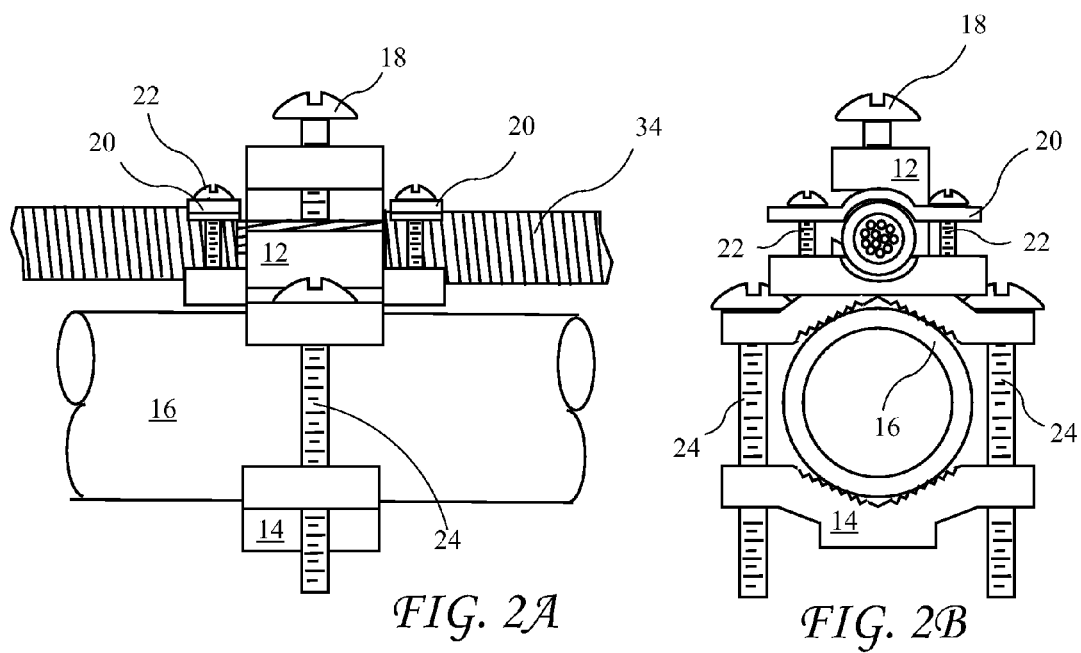

MIDPOINT CABLE ELECTRICAL GROUND CLAMP

BACKGROUND OF THE INVENTION

The present invention relates to electrical grounding and bonding, and more particularly to a ground fitting for easily grounding or bonding a ground wire carried in spiral metal sheathing (e.g., an armored cable) at a midpoint along the length of the sheathed cable.

Ground wires frequently require protection from damage. The ground wire is generally a heavy gauge wire, for example eight gauge, six gauge, or four gauge, and may be stranded or solid, and is generally uninsulated. A common method for protecting a ground wire is to carry the ground wire in a spiral metal sheathing (e.g., armored cable), thereby creating an armored ground wire. Such spiral metal sheathing provides the desired protection to the ground wire.

It is often necessary to connect the ground wire to a ground member (or ground point) such as a water pipe or ground rod, positioned at a point along the length of the armored cable (i.e., not at an end). Unfortunately, the spiral metal sheathing may frustrate or complicate attempts to electrically connect to the ground wire. To accomplish this connection, the protective metal sheathing must be cut to expose the ground wire. The sheathing on one side of the cut must be removed and the ground wire threaded through a ground fitting attached to the ground member. Then, the sheathing must be replaced over the ground wire. This can be a difficult task, especially if a long length of sheathing has been removed.

Further, known fittings for grounding and bonding armored ground wires do not sufficiently grasp ends of the metal sheathing to meet code requirements.

Therefore, a need remains for a ground fitting (or clamp) and method of use which simplifies connecting a ground wire carried in a metal sheathing, to a ground point along a length of sheathed ground wire. The ground fitting must further secure the ends of the metal sheathing sufficiently to meet code requirements.

BRIEF SUMMARY OF THE INVENTION

The present invention addresses the above and other needs by providing a ground fitting (or clamp) which allows simplified electrical connection between a ground wire carried in a metal sheathing, and a ground point such as a water pipe or ground rod. The metal sheathing is cut and separated and a short length of ground wire is exposed. The ground wire is inserted laterally into a wire clamp portion of the ground fitting, and opposing ends of the metal sheathing carrying the ground wire are inserted longitudinally under clamping plates on opposite sides of the ground fitting. A ground screw is tightened against the ground wire to hold the ground wire in the ground fitting and plate screws securing the clamping plates are tightened to secure the sheathing under the clamping plates.

In accordance with one aspect of the invention, there is provided a midpoint ground fitting. The ground fitting includes an armored ground wire grasping portion and a ground point grasping portion. The armored ground wire grasping portion includes a first armored cable entry, a first armored cable clamp, a second armored cable entry opposite the first armored cable entry, a second armored cable clamp, a ground cable passage, a ground cable mouth, and a ground wire screw. The first armored cable clamp comprises a first clamp seat facing a first clamping plate for sandwiching a first armored cable end inserted into the first armored cable entry. The first clamp seat and the first clamping plate include interior concave dished portions including interior ridges for engaging an exterior spiral surface of the armored cable to retain the first armored cables end in the first armored cable entry. Similarly, the second armored cable clamp comprises a second clamp seat facing a second clamping plate for sandwiching a second armored cable end inserted into the second armored cable entry. The second clamp seat and the second clamping plate including interior concave dished portions including interior ridges for engaging the exterior spiral surface of the armored cable to retain the second armored cable end in the second armored cable entry. The ground wire passage between the first armored cable entry and the second armored cable entry provides for passage of the ground wire through the sheathed ground wire grasping portion. The ground wire mouth opens into the ground wire passage for allowing lateral inserting of the ground wire into the ground wire passage. The ground wire screw intersects the ground wire passage between the armored cable entries and is approximately perpendicular to the ground wire passage to intersect and thereby clamp the ground wire in the sheathed ground wire grasping portion. The ground point grasping portion is electrically connected to the cable grasping portion and is adapted to electrically connect to a ground point.

In accordance with another aspect of the invention, there is provided a method for adding a midpoint ground point connection to an armored ground wire. The method includes cutting through a metal armored cable sheath surrounding a ground wire to form a first armored cable end and an opposing second armored cable end without any substantial cutting into the ground cable, separating the two armored cable ends to expose a short length of the ground wire, laterally inserting the exposed ground wire through a ground cable mouth of a ground fitting into a ground cable passage through the ground fitting, tightening a ground wire clamp to grip the ground wire in place in the ground wire passage, inserting the opposing armored cable ends into armored cable entries at opposite ends of the ground fitting and into armored cable clamps, tightening the armored cable clamps to grip the armored cable ends and connecting the ground fitting to a ground point. Tightening a ground wire clamp may comprise tightening a ground wire screw against the ground wire, wherein the ground wire screw is approximately centered on the ground wire passage and advances against the ground wire in a direction approximately perpendicular to the ground cable passage. Tightening the armored cable clamps may comprise tightening clamping plates to sandwich the armored cable ends between concave dished portions of the clamping plates and clamp seats and intersecting at least one ridge on the concave dish portions with exterior spiral surfaces of each of the armored cable ends to retain the armored cable ends in the armored cable entries. In one embodiment, ridges are provided on both the clamping plate and clamp seat to further secure the ends of the metal sheathing sufficiently to meet code requirements.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 is an armored ground wire suitable for use with the present invention.

FIG. 2A is a side view of a ground fitting according to the present invention connecting a sheathed ground wire to a ground point.

FIG. 2B is an end view of the ground fitting according to the present invention connecting the sheathed ground wire to the ground point.

FIG. 2C is a top view of the ground fitting according to the present invention connecting the sheathed ground wire to the ground point.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

An armored (or sheathed) ground wire 30 suitable for use with the present invention is shown in FIG. 1. The armored ground wire 30 is generally protected by an armored cable 32 formed from a metal spiral allowing flexing while protecting the ground wire 34 inside the armored cable 32. Unfortunately, making a midpoint ground using known fittings requires the armored cable 32 be cut to expose an armored cable end 32a and the ground wire 34. The armored cable 32 on one side of the cut must be removed and the ground wire 34 threaded through a ground fitting attached to the ground member. Then, the armored cable 32 must be replaced over the ground wire 34. This can be a difficult task, especially if a long length of armored cable 32 has been removed.

Figure 3:
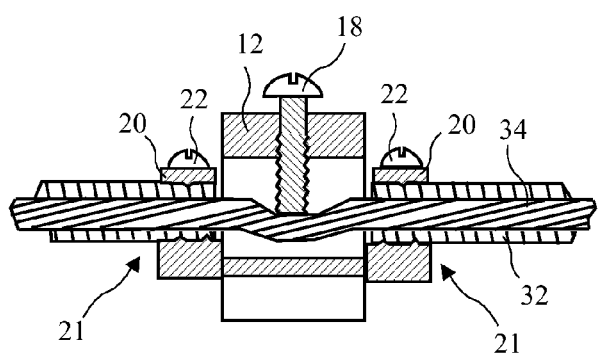
FIG. 3 is a cross-sectional view taken along line 3-3 of FIG. 2C of the ground fitting according to the present invention with the sheathed ground wire held in a cable grasping member, of the ground fitting, according to the present invention.

A side view of a ground fitting 10 (see FIG. 4A-4C) according to the present invention connecting an armored ground wire 30 to a ground point 16 is shown in FIG. 2A, an end view of the ground fitting 10 connecting the armored ground wire to the ground point is shown in FIG. 2B, a top view of the ground fitting 10 connecting the armored ground wire to the ground point is shown in FIG. 2C, and a cross-sectional view taken along line 3-3 of FIG. 2C of the ground fitting according to the present invention with the sheathed ground wire held in a cable grasping member, of the ground fitting is shown in FIG. 3. The ground wire 34 resides in a ground wire passage 36 (see FIG. 4B) passing through the armored ground wire grasping portion 12. A ground wire screw 18 is advanced against the ground wire 34 to grip the ground wire 34. The ground wire screw 18 is preferably approximately centered in the armored ground wire grasping portion 12 and approximately perpendicular to the ground wire passage 36.

The armored cable 32 is cut to expose a portion of the ground wire 34 which is laterally inserted into the ground wire passage 36 through the mouth 40. The armored cable ends 32a are inserted into armored cable entries 21 and sandwiched in an armored cable clamp formed between clamp seats 23 and clamping plates 20. The screw 18 is tightened against the exposed ground wire 34 and screws 22 are used to tighten the clamping plate 20 against the armored cable 32 to hold the armored cable 32. The screws 22 are preferable 10-24 stainless steel screws.

The ground point 16 is commonly a pipe or ground rod. The pipe or ground rod 16 is held between a bottom surface of the armored ground wire grasping portion 12 and a ground point plate 14 for sandwiching the pipe or ground rod 16. Screws 24 are tightened to clamp the pipe or ground rod 16.

Figure 4C:
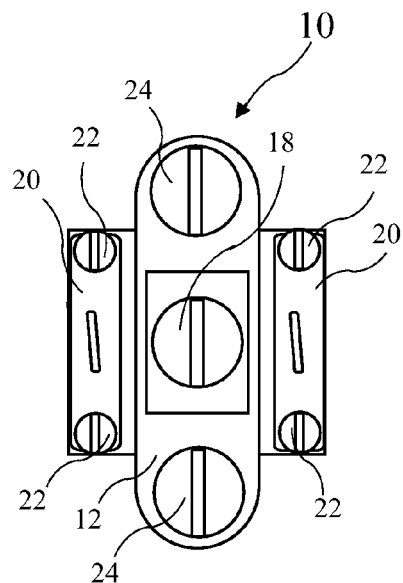
FIG. 4C is a top view of the ground fitting alone.
Figure 4A:
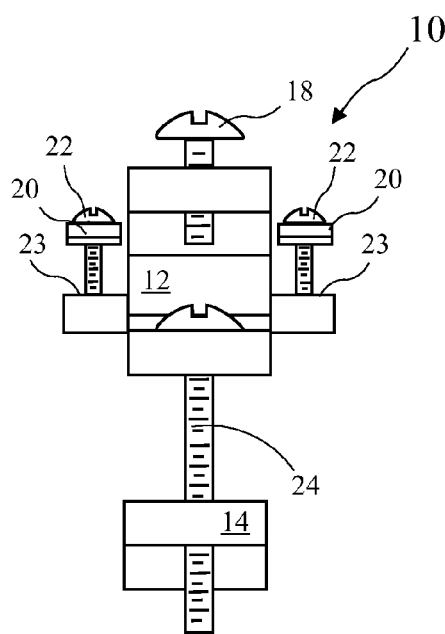
FIG. 4A is a side view of the ground fitting alone.
Figure 4B:
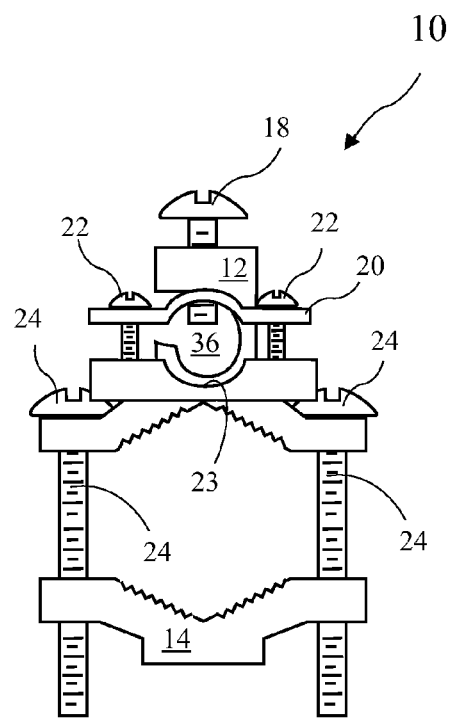
FIG. 4B is an end view of the ground fitting alone.

A side view of the ground fitting 10 alone is shown in FIG. 4A, an end view of the ground fitting 10 alone is shown in FIG. 4B, and a top view of the ground fitting 10 alone is shown in FIG. 4C. The ground wire passage 36 is provided for the ground wire 34.

Figure 5C:
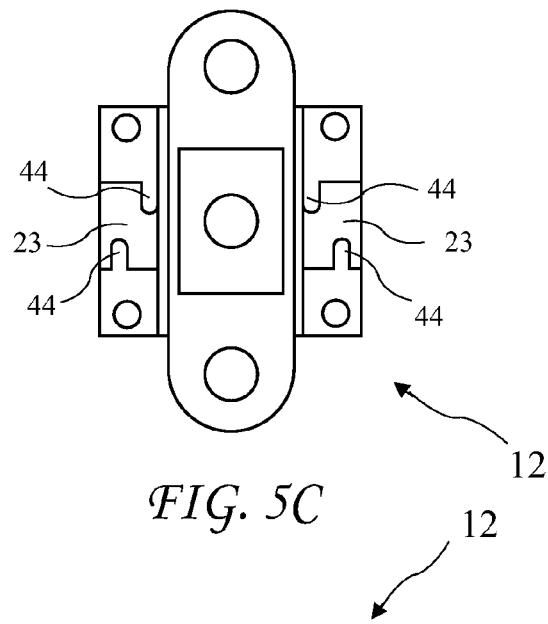
FIG. 5C is a top view of the second clamp half according to the present invention.
Figure 5A:
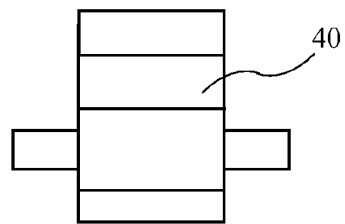
FIG. 5A is a side view of the cable grasping member according to the present invention.
Figure 5B:
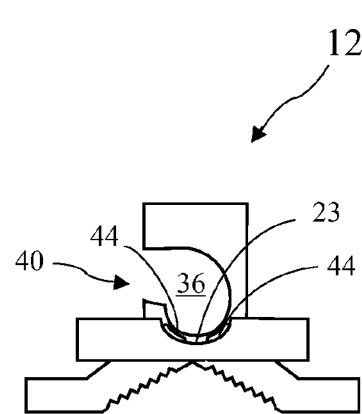
FIG. 5B is an end view of the cable grasping member according to the present invention.

A side view of the cable grasping member 12 according to the present invention is shown in FIG. 5A, an end view of the cable grasping member 12 is shown in FIG. 5B, and a top view of the cable grasping member 12 is shown in FIG. 5C. A ground wire mouth 40 allows the ground wire 34 to be inserted laterally into the ground wire passage 36, thereby eliminating the need to thread the ground wire through known ground fittings. The clamp seats 23 preferably include interior concave dished portions including interior ridges 44 for engaging an exterior spiral surface of the armored cable 32 to retain the armored cable ends in the armored cable entry 21 (see FIG. 3). The ridges 44 preferably are a pair of two short offset clamp seat ridges 44 in opposite corners of the concave dished clamp seat 23 for engaging the exterior spiral surface of the armored cable 32.

Figure 6A:
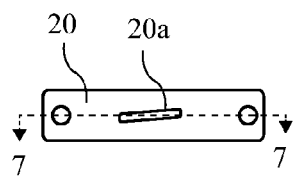
FIG. 6A is a top view of a clamping plate according to the present invention for holding the sheathing.
Figure 6B:
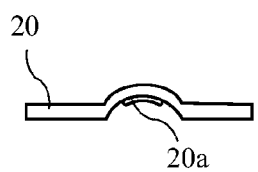
FIG. 6B is a side view of the clamping plate according to the present invention.
Figure 7:
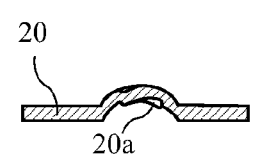
FIG. 7 is a cross-sectional view of the clamping plate according to the present invention taken along line 7-7 of FIG. 6A.

A top view of a clamping plate 20 according to the present invention for holding the armored cable 32 is shown in FIG. 6A, a side view of the clamping plate 20 is shown in FIG. 6B, and a cross-sectional view of the clamping plate 20 taken along line 7-7 of FIG. 6A is shown in FIG. 7. The clamp plate 20 includes concave dished portions facing the clamp seats 23 and each clamp plate 20 includes a shallow ridge 20a inside the concave dished portion turned slightly away from the direction of the ground wire passage 35 and approximately aligned with an exterior spiral surface of the armored cable 32 for engaging the exterior spiral surface of the armored cable to retain the armored cables ends in the armored cable entries. Previous apparatus for clamping armored cable ends has failed to meet new electrical requirements requiring, for example, the clamping to hold under 50 pounds of tension. The combined ridges 20a and 44 significantly increase the force required to pull the armored cable 32 out of the ground fitting 10 thereby meeting the new requirements. The ridges extend approximately 0.035 inches from the concave dished surface to engage the armored cable.

The screws 18 and 24 and the clamping plates 20 are preferably zinc coated steel, and more preferably have an approximately 0.001 inch thick zinc coating. The ground wire grasping portion 12 and the ground point plate 14 are preferably made of a copper alloy and are more preferably approximately 80 percent copper.

While the invention herein disclosed has been described by means of specific embodiments and applications thereof, numerous modifications and variations could be made thereto by those skilled in the art without departing from the scope of the invention set forth in the claims.

I claim:

1. A ground fitting comprising:
a sheathed ground wire grasping portion comprising:
- a first armored cable entry;
- a first armored cable clamp for grasping a first armored cable end inserted into the first armored cable entry;
- a second armored cable entry opposite the first armored cable entry;
- a second armored cable clamp for grasping a second armored cable end inserted into the second armored cable entry;
- a ground wire passage between the first armored cable entry and the second armored cable entry for passage of the ground wire through the sheathed ground wire grasping portion;
- A ground wire mouth allowing lateral insertion of the ground wire into the ground wire passage;
- a ground wire clamp between the first armored cable entry and the second armored cable entry for grasping the ground wire; and
a ground point grasping portion electrically connected to the cable grasping portion and adapted to electrically connect to a ground point.

2. The ground fitting of claim 1, wherein the ground wire mouth opens to the side of the sheathed ground wire grasping portion.

3. The ground fitting of claim 1, wherein the ground point is a pipe and the pipe and the ground wire passage are substantially co-axial.

4. The ground fitting of claim 1, wherein the ground point is a ground rod and the ground rod and the ground wire passage are substantially co-axial.

5. The ground fitting of claim 1, wherein:
ground wire clamp comprises a ground wire screw, the ground wire screw intersects the ground wire passage approximately perpendicular to the ground wire passage and approximately laterally centered on the ground wire passage to intersect and thereby clamp the ground wire in the sheathed ground wire grasping portion.

6. The ground fitting of claim 1, wherein each armored cable clamp comprises a clamp seat and a clamping plate for sandwiching the armored cable ends to secure the armored cable ends in the sheathed ground wire grasping portion.

7. The ground fitting of claim 6, wherein the clamp seats include a clamp seat ridge facing the armored cable for engaging the armored cable ends to secure the armored cable ends in the sheathed ground wire grasping portion.

8. The ground fitting of claim 7, wherein the clamp seats comprise a concave dished portion of the armored cable entry facing the clamping plates and the clamp seat ridge comprises two short offset clamp seat ridges in opposite corners of the concave dished clamp seat for engaging an exterior spiral surface of the armored cable to retain the armored cables ends in the armored cable entries.

9. The ground fitting of claim 6, wherein the clamping plates include a plate ridge for engaging the armored cable ends to secure the armored cable ends in the sheathed ground wire grasping portion.

10. The ground fitting of claim 9, wherein the clamping plates include a concave dished portion facing the clamp seats and the plate ridges comprise shallow ridges inside the concave dished portion turned slightly away from the direction of the ground wire passage and approximately aligned with an exterior spiral surface of the armored cable for engaging the exterior spiral surface of the armored cable to retain the armored cables ends in the armored cable entries.

11. The ground fitting of claim 1, wherein the ground point grasping portion comprises a bottom surface of the sheathed ground wire grasping portion and a ground point plate for sandwiching the ground point.

12. A ground fitting comprising:
an armored ground wire grasping portion comprising:
- a first armored cable entry;
- a first armored cable clamp comprising a first clamp seat facing a first clamping plate for sandwiching a first armored cable end inserted into the first armored cable entry, the first clamp seat and the first clamping plate including interior concave dished portions including interior ridges for engaging an exterior spiral surface of the armored cable to retain the first armored cables end in the first armored cable entry;
- a second armored cable entry opposite the first armored cable entry;
- a second armored cable clamp comprising a second clamp seat facing a second clamping plate for sandwiching a second armored cable end inserted into the second armored cable entry, the second clamp seat and the second clamping plate including interior concave dished portions including interior ridges for engaging the exterior spiral surface of the armored cable to retain the second armored cables end in the second armored cable entry;
- a ground wire passage between the first armored cable entry and the second armored cable entry for passage of the ground wire through the sheathed ground wire grasping portion;
- a ground wire mouth opening the ground wire passage for allowing lateral inserting of the ground wire into the ground wire passage; and
- a ground wire screw intersecting the ground wire passage between the armored cable entries and approximately perpendicular to the ground wire passage and approximately laterally centered on the ground wire passage to intersect and thereby clamp the ground wire in the sheathed ground wire grasping portion; and
a ground point grasping portion electrically connected to the cable grasping portion and adapted to electrically connect to a ground point.

* * * * *